United States Patent
Kroeger et al.

[11] Patent Number: 5,828,957
[45] Date of Patent: Oct. 27, 1998

[54] SATELLITE BEAM ACQUISITION/ CROSSOVER FOR A MOBILE TERMINAL

[76] Inventors: Brian W. Kroeger, 12813 Amberwoods Way, Sykesville, Md. 21784; Gregory W. Seker, 5310 Cedar La. #208, Columbia, Md. 21044; Paul J. Peyla, 6528 Meadowfield Ct., Elkridge, Md. 21227; George N. Eberl, 10106 Darlington Rd., Columbia, Md. 21044; Denise M. Cammarata, 12087 Long Lake Dr., Owings Mills, Md. 21117

[21] Appl. No.: 615,937

[22] Filed: Mar. 14, 1996

[51] Int. Cl.[6] .................................................. H04Q 7/00
[52] U.S. Cl. ............................................ 455/428; 370/320
[58] Field of Search .................................... 455/12.1, 13.3, 455/33.1–33.4, 427, 428; 370/320, 332, 335, 491, 500; 342/354

[56] References Cited

U.S. PATENT DOCUMENTS

| | | | |
|---|---|---|---|
| 5,109,390 | 4/1992 | Gilhousen et al. | 370/335 |
| 5,416,797 | 5/1995 | Gilhousen et al. | 370/335 X |
| 5,490,087 | 2/1996 | Redden et al. | 455/33.1 X |
| 5,577,025 | 11/1996 | Skinner et al. | 370/500 X |
| 5,602,833 | 2/1997 | Zehavi | 455/33.1 X |
| 5,608,722 | 3/1997 | Miller | 370/320 |

*Primary Examiner*—Thomas J. Mullen, Jr.
*Attorney, Agent, or Firm*—R. P. Lenart

[57] ABSTRACT

An improved satellite beam acquisition and crossover technique for finding an appropriate satellite beam by searching for and acquiring a strongest pilot channel, searching for signalling channels on the acquired strongest pilot channel and monitoring the acquired signalling channel. Beam acquisition of a continuous wave pilot as in the preferred embodiment is faster and more reliable than beam acquisition of a modulated channel. Moreover, the acquired pilot channel can be used to unambiguously precalibrate the frequency reference of the mobile terminal. Also, acquisition of the pilot ensures that the corresponding satellite beam is not blocked or shadowed immediately prior to searching for a signalling channel, which significantly improves the reliability while reducing the time required for the search process. Mitigation of fading and shadowing is provided by using fast attack, slow decay non-linear filtering.

18 Claims, 5 Drawing Sheets

SATELLITE BEAM ACQUISITION/ CROSSOVER FOR A MOBILE TERMINAL

CROSS REFERENCE TO RELATED APPLICATIONS

This application is related to application U.S. Ser. No.: 08/322,847 filed by Brian W. Kroeger, Jeffrey S. Baird and Joseph B. Bronder on Oct. 13, 1994 entitled "Carrier Tracking Loop for QPSK Demodulator", issued as U.S. Pat. No. 5,579,345 which is incorporated herein by reference.

FIELD OF THE INVENTION

The present invention relates to an improved satellite beam acquisition/crossover technique, intended for use with a mobile terminal, which acquires the best satellite beam signal from a plurality of beam signals transmitted from multiple satellites. Each satellite transmits and receives information over multiple beams, wherein each beam has a plurality of communication channels. The present invention also provides beam crossover selection when a mobile terminal is moving from one beam coverage area to another.

DESCRIPTION OF THE BACKGROUND ART

In general, satellite communication systems such as the MSAT (Mobile Satellite) system includes a set of two to eight satellites which relay full-duplex digital voice, data and facsimile signals between a ground segment such as a public switched telephone network (PSTN) and mobile terminals. Typically, the mobile terminals may be installed in aircraft, boats and primarily automobile installations similar to cellular telephones. Each satellite provides communication capability over multiple spot beams (i.e. 4 to 32) wherein each spot beam can support up to 256 communications channels. Geostationary satellites are used and the channels are organized as frequency division multiplexed (FDM) single channel per carrier (SCPC) channels. This technique can also be implemented with low earth orbit (LEO) satellites and time division multiplex access (TDMA) or carrier division multiplex access (CDMA) channels.

Beam/channel acquisition in this case corresponds to acquisition and monitoring (reception) of an outbound digitally modulated TDM signalling channel by a mobile terminal, wherein the outbound signal originates at a ground segment and is transmitted to the mobile terminal via a satellite. The signalling channel is used to broadcast information via a set of messages referred to as a bulletin board (BB). The bulletin board includes, among other information, information regarding signalling and pilot channel assignments for any particular mobile terminal. The bulletin boards contain frequency information for multiple beams across multiple satellites. Each mobile terminal stores the latest valid bulletin board information received in a non-volatile memory for subsequent usage. All of the signalling channels known to a particular mobile terminal carry bulletin board information.

Generally, the goal of a conventional mobile terminal in a satellite communications system as described above is to firstly find an assigned signalling channel that is within the beam coverage area in which the mobile terminal is located. The assigned signalling channel is the preferred signalling channel designated for the particular beam coverage area and includes bulletin board information for the beam coverage area. The second goal of the acquisition process is to decode the bulletin board information from the acquired signalling channel. The third goal is to confirm that the decoded bulletin board information agrees with the channel assignment. If not, the correct assigned signalling channel is reacquired using the decoded bulletin board information.

Conventional acquisition/crossover techniques have been limited to searching for and testing the signalling channels based on an ordered list of signalling channels such that a most probable or desirable signalling channel is searched for first. For example, the assigned signalling channel in the particular beam that was last logged on to by a mobile terminal is uniquely designated as the operational signalling channel for that particular mobile terminal. According to the conventional technique, the mobile terminal would first attempt to acquire the operational signalling channel. In the event of a signal fade or blockage (e.g. from a building or tree), acquisition of the operational signalling channel may be prevented. However, in this situation, the mobile terminal would not necessarily know if the signal was blocked or if the user had driven out of the coverage area of the particular beam that was last logged on to. In the event that the mobile terminal could not acquire the operational signalling channel, the mobile terminal would attempt to acquire another signalling channel on the particular beam. After unsuccessfully attempting to acquire the signalling channels on the particular beam of the current satellite, the mobile terminal would thereafter attempt to acquire other signalling channels on other beams of the current satellite. If acquisition of signalling channels on the beams of the current satellite was unsuccessful, the mobile terminal would repeat the process on beams of another satellite. Between each acquisition attempt of a non-operational signalling channel, the mobile terminal would attempt acquisition of the operational signalling channel, since the operational signalling channel would most likely be acquired if the occurrence of a signal fade or blockage is more likely than channel frequency reassignment.

The conventional beam crossover technique is similar to the conventional beam acquisition technique except that the signalling channel search would be limited to assigned signalling channels only, since the current bulletin board information stored is assumed to be valid. The beam crossover process would be initiated when the operational signalling channel degrades to a marginal condition. If the operational signalling channel degrades further to a poor condition before successful beam crossover occurs, beam acquisition would be invoked.

A disadvantage of the above-noted conventional acquisition/crossover technique is the use of inadequate channel quality measurement based on packet error rate. A further disadvantage is the use of an inefficient signalling channel search strategy for beam steered antennas. Also, the method of processing channel quality measurements is less than reliable. These disadvantages of the conventional acquisition/crossover technique may contribute to acquisition of an inferior beam or a wrong channel, inappropriate beam crossover, excessive acquisition time and longer, more frequent outages due to intermittent channel conditions.

SUMMARY OF THE INVENTION

An object of the present invention is to provide an improved beam acquisition/crossover technique for a mobile terminal in a satellite communications system which overcomes the previously described disadvantages of the conventional beam acquisition technique. An object of the present invention is to reduce acquisition time and crossover/search time. A further object is to provide a more reliable beam selection process.

These objects may be fulfilled by providing a method of satellite beam acquisition for a mobile terminal in a satellite communications system having a plurality of satellites which each transmit and receive signals over a plurality of satellite beams, each of the satellite beams including a pilot channel, a plurality of signalling channels carrying bulletin board information and a plurality of communication channels, the method of satellite beam acquisition including searching for and acquiring a strongest pilot channel of the satellite beams received by the mobile terminal;
   acquiring a signalling channel of the satellite beam corresponding to the acquired pilot channel; and
   monitoring reception of the acquired signalling channel.

In a preferred embodiment of the method of satellite beam acquisition, selection of the strongest pilot channel is based on the determined signal to noise ratio of the pilot channels. In a still further preferred embodiment, successive discrete Fourier transformations are performed over contiguous blocks of a pilot channel to determine the signal to noise ratio of a pilot channel.

In an additional further preferred embodiment, the determined signal to noise ratio of a pilot channel is non-linearly filtered with a fast-attack, slow decay filter characteristic to mitigate the effects of fading and shadowing.

The above objects may also be provided by a mobile terminal for use in a satellite communications system having a plurality of satellites which each transmit and receive signals over a plurality of satellite beams, each of the satellite beams including a pilot channel, a plurality of signalling channels carrying bulletin board information and a plurality of communication channels, the mobile terminal including a pilot channel selector for searching for and acquiring a strongest pilot channel of the satellite beams received by the mobile terminal;
   a signalling channel selector for acquiring a signalling channel of the satellite beam corresponding to the acquired pilot channel; and
   a monitor for monitoring reception of the acquired signalling channel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DESCRIPTION OF THE PREFERRED EMBODIMENTS

Figure 1:
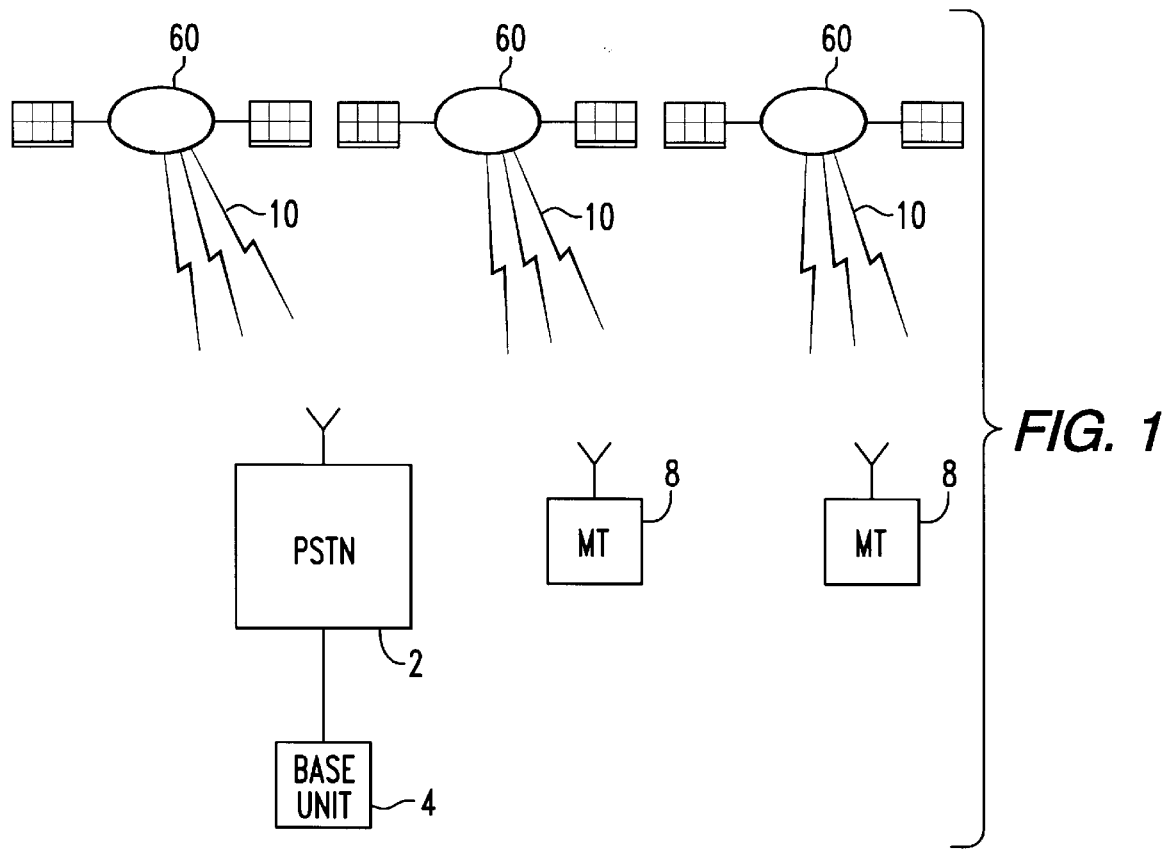
FIG. 1 is an illustration of a satellite communications system of a preferred embodiment of the present application.

FIG. 1 is an illustration of a satellite communication system of a preferred embodiment of the present application. The system includes a plurality of satellites denoted as 60 which each communicate with public switched telephone network (PSTN) 2 and mobile terminals 8 via multiple spot beams 10. Each satellite may transmit and receive signals on up to 32 beams. Each beam includes a primary pilot having a predetermined unique frequency and an optional secondary pilot, up to 16 assigned signalling channels which contain bulletin board information and up to 256 communications channels. The communications channels provide full-duplex digital voice, data and facsimile communications capability, but are not limited thereto. For example, base unit 4 coupled to PSTN 2 may be a telephone, a facsimile machine, a personal computer or any other device capable of digital communication.

Figure 2:
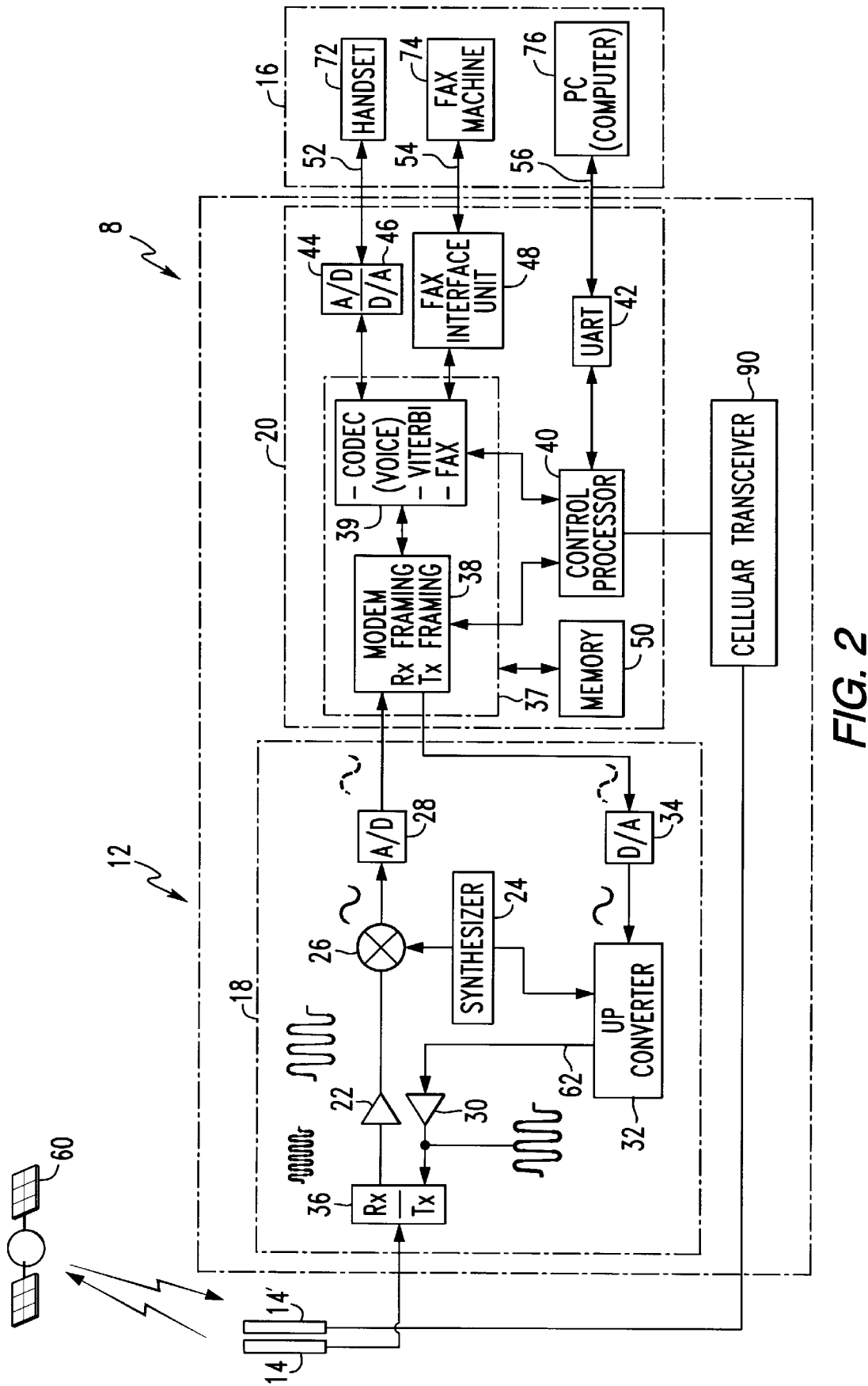
FIG. 2 illustrates a preferred embodiment of a mobile terminal for use in the present application.

FIG. 2 illustrates a preferred embodiment of mobile terminal 8 including transceiver 12, antenna 14 and user interface 16. Mobile terminal 8 is illustrated as communicating with a satellite 60. Transceiver 12 is illustrated as including RF section 18, processor board 20 and cellular transceiver 90.

RF section 18 has a receiving portion that includes a low-noise amplifier 22, a down-converter (multiplier) 26 and an analog to digital converter (A/D) 28. RF section 18 also has a transmitter portion that includes a high-power amplifier (HPA) 30, an up-converter 32, signal line 62 and digital to analog converter (D/A) 34. The antenna 14 is connected to RF section 18 through diplexer 36.

Processor board 20 has a digital signal processor 37 including a modem processor 38 and a coder/decoder and facsimile processor 39, a control processor 40, a universal asynchronous receiver/transmitter (UART) 42, an A/D converter 44, a D/A converter 46, a facsimile interface unit 48 and memory 50 which may be a non-volatile memory. Cellular transceiver 90, as coupled to control processor 40 of processor board 20, provides mobile terminal 8 with cellular communications capability if desired, in addition to satellite communications capability.

User interface 16 of mobile terminal 8 includes an input/output port 52 for a handset 72, an input/output port 54 for a facsimile machine 74 and an input/output port 56 for a personal computer 76. User interface 16 may also include a cellular transceiver board, although not illustrated. It is to be understood that the mobile terminal 8 is not particularly limited to the above-described components and that various other equivalent or alternative components may be used as would be understood by one of ordinary skill.

In operation, the transmit signal begins in processor board 20 as digital data, which is then converted into digitized, modulated waveform samples. This digitized waveform, which is created by digital signal processor 37, is output to D/A converter 34 of RF section 18. D/A converter 34 converts the digitized waveform into an analog in-phase (I) waveform and an analog quadrature (Q) waveform. The analog I and Q waveforms are output from D/A converter 34 to up-converter 32, which may be an up-converter modulator or a mixer, which up-converts the analog I and Q waveforms to an L-band frequency and then sums the up-converted I and Q waveforms to form a low level L-band transmit signal on line 62. The low level L-band transmit signal is amplified by high-power amplifier 30 and subsequently passed through the transmit side Tx of diplexer 36. The I level L-band transmit signal is subsequently transmitted from mobile terminal 8 to satellite 60 via antenna 14.

An L-band signal transmitted from satellite 60 and subsequently received by antenna 14 is provided to the receive RX side of diplexer 36 and is output to low-noise amplifier 22. The L-band receive signal is multiplied in down-converter 26, which may be a mixer, by an output of synthesizer 24 to down-convert the low level L-band receive signal to an intermediate frequency in order to aid in signal filtering and to reduce the sampling rate of A/D converter 28 so that digital signal processor 37 can keep up with sample arrivals. Once the receive signal has been sampled and loaded into digital signal processor 37, subsequent signal processing is performed by modem processor 38 and coder/decoder and facsimile processor 39 under control of control processor 40. The received signals are demodulated, or translated, from their waveform representation into a digital data representation and are decoded and packaged for voice, facsimile or data processing by processor 39.

Digital signal processor 37 of processor board 20 is implemented to provide a digital demodulation function and a digital modulation function. Modem processor 38 of digital signal processor 37 is implemented to provide a receive framing function for the signals provided thereto by A/D converter 28 and a transmit framing function for the signals provided thereto by coder/decoder and facsimile processor 39. Coder/decoder and facsimile processor 39 of digital signal processor 37 is implemented to provide an encoding and a decoding function. It is to be understood that the above described components of mobile terminal 8 are given by way of illustration only and that various equivalent components or elements may be used. For example, the digital demodulation and modulation functions are described as provided by digital signal processor 37. However, the demodulation and modulation functions may be provided by discrete demodulator and modulator hardware components, respectively. Also, the various interfaces and units coupled to transceiver 12 are not limited to those particularly illustrated in FIG. 2.

The acquisition/crossover technique of a preferred embodiment of the present invention which may be usable with the satellite communication system illustrated in FIG. 1 and the mobile terminal illustrated in FIG. 2 will now be described. In general, the technique is a two-step process firstly involving the acquisition of the strongest pilot channel in order to identify the most appropriate satellite beam for a given coverage area in which the mobile terminal is located. The process secondly involves the acquisition of the assigned signalling channel within the particular beam which corresponds to the strongest pilot channel acquired. This two-step process reduces the scope of the signalling channel search by first identifying the beam by the acquired pilot channel frequency. It is to be understood that in the preferred embodiment, signalling channels can be acquired only in the particular beam where the strongest pilot channel is found.

Figure 3:
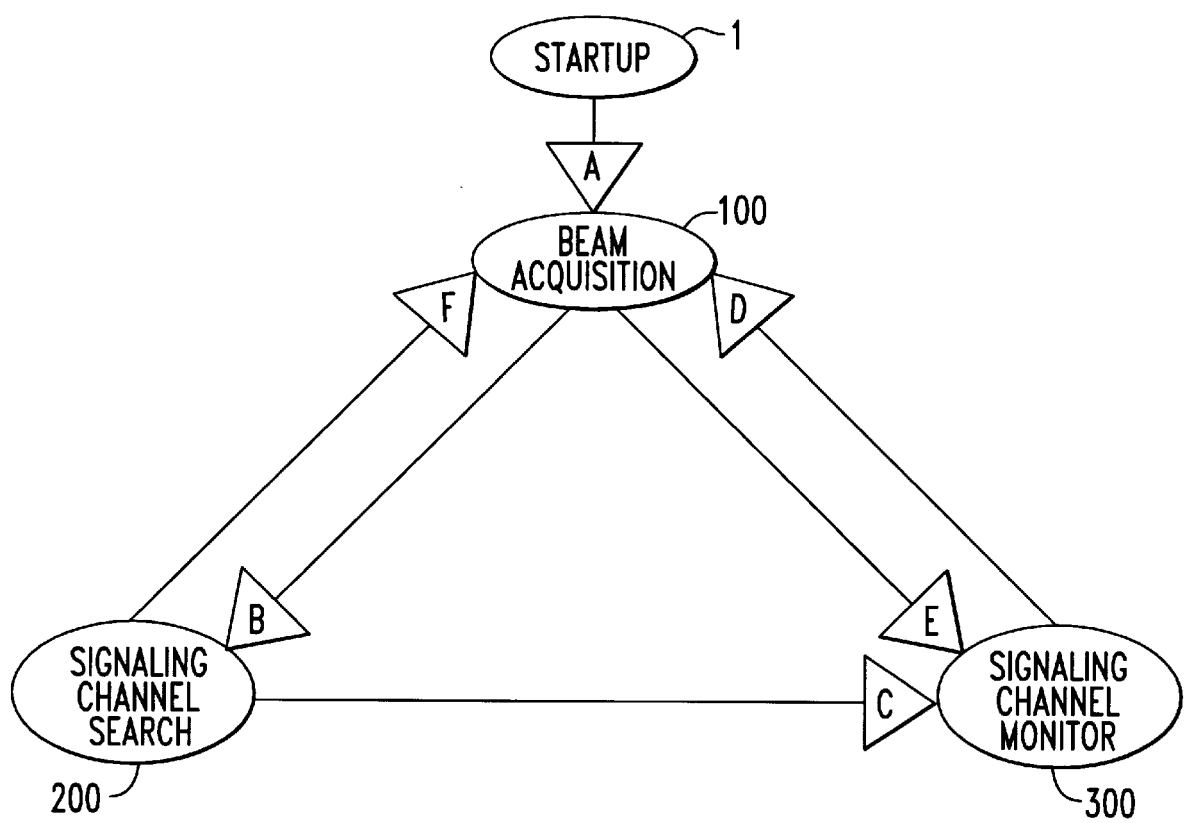
FIG. 3 is a top level state diagram illustrating the state transition conditions involved in the acquisition/crossover processes of a preferred embodiment of the present application.

FIG. 3 is a top level state diagram illustrating the state transition conditions involved in the acquisition/crossover processes of a preferred embodiment of the present application. After start up at state 1 of FIG. 3, the beam acquisition state 100 is entered through state transition A. The purpose of beam acquisition state A is to either find a good or at least an acceptable satellite beam for communication by finding the strongest pilot channel for the particular coverage area in which the mobile terminal is located. This purpose may be fulfilled by verifying that the pilot channel of the most recently logged on satellite beam is still acceptable. The satellite beam most recently logged on to is referred to as the operational beam of that particular mobile terminal. In either case, upon finding and acquiring a satellite beam selected based upon the strongest pilot channel available or based upon an acceptable operational beam, a state transition from the beam acquisition state 100 to the signalling channel search state 200 along state transition B occurs.

In the signalling channel search state 200, the mobile terminal attempts to acquire one of the signalling channels on the list of signalling channels within this particular beam. A list of signalling channels is contained within the bulletin board information of the most recent operational beam logged on to by the mobile terminal. Preferably, the signalling channel acquired during signalling channel search state 200 is the operational signalling channel or assigned signalling channel for the particular beam. The assigned signalling channel is a predetermined signalling channel which is designated for the particular beam. If signalling channel acquisition is successful, then the bulletin board information of the acquired signalling channel of the particular beam is downloaded by the mobile terminal and the downloaded bulletin board information is checked to verify that the acquired signalling channel is the operational signalling channel or assigned signalling channel of the particular beam. It is to be understood that the bulletin board information of each beam includes information identifying assigned signalling channels for each particular beam. In the event that acquisition of a signalling channel in signalling channel search state 200 is unsuccessful, the mobile terminal will return to beam acquisition state 100 via state transition F. On the other hand, if an appropriate signalling channel has been acquired in signalling channel search state 200, the mobile terminal shall enter signalling channel monitor state 300 via state transition C.

In signalling channel monitor state 300, the mobile terminal monitors the acquired signalling channel. In the event that the mobile terminal loses the acquired signalling channel for a sufficiently long time, the mobile terminal will transition from signalling channel monitor state 300 to beam acquisition state 100 via state transition D. Also, during signalling channel monitor state 300, the mobile terminal will periodically transition back to beam acquisition state 100 to evaluate the SNR of the acquired pilot. In the event that a new beam having a stronger pilot channel is not found in beam acquisition state 100 after entry thereto via state transition D, the mobile terminal will return to signalling channel monitor state 300 via state transition E. Transition from signalling channel monitor state 300 to beam acquisition state 100 and back to signalling channel monitor state 300 in this manner may occur when the mobile terminal is moving along peripheral boundaries of a particular coverage area, for example. In the event that a stronger pilot channel is found in beam acquisition state 100 after transition thereto via state transition D, beam crossover will be implemented such that the particular beam of the stronger pilot channel will be acquired and utilized. Beam crossover in this instance would occur for example when the mobile terminal enters a different coverage area.

Beam acquisition state 100 will be described in greater detail with reference to FIG. 4. Firstly, it is to be understood that a beam is defined as a signal path from a satellite which illuminates a beam coverage area on the earth. As previously emphasized, each beam carries a primary pilot and possibly one optional secondary pilot, an assigned signalling channel and optional additional signalling channels which broadcast bulletin board information and communications channels. The beam acquisition strategy of a preferred embodiment of the present application is to search the pilot channels of the beams to determine the strongest pilot channel, which is indicative of the particular beam coverage area within which the mobile terminal is located. Once the strongest pilot channel indicative of the beam coverage area for the mobile terminal has been identified (after exceeding some minimum signal level requirement), the search for the appropriate signalling channel is limited to signalling channels within the particular beam.

Acquisition of the pilot channel as described above allows for calibration of the mobile terminal frequency reference, which is significantly beneficial for eliminating the possibility of subsequent false acquisition of a signalling channel. Moreover, acquisition of the pilot channel is more reliable and faster than acquisition of a signalling channel, especially when the mobile terminal employs a beam steered antenna. The above described progression of the preferred embodiment from acquisition of the pilot channel to acquisition of the signalling channel results in reduced acquisition time and crossover/search time, and more reliable beam selection. Also, the use of pilot channels for more than merely conventional frequency calibration results in improvement of the acquisition/tracking performance of a beam steered antenna in a mobile communications environment.

An advantage of acquiring the pilot channel first as in a preferred embodiment of the present application is that the known pilot channel frequency can be used to unambiguously calibrate the mobile terminal frequency reference prior to signalling channel acquisition. Although the intended use of the pilot channel of a conventional mobile terminal acquisition technique is frequency calibration, since the signalling channel is acquired first in the conventional technique, precalibration of the frequency can not be realized. A further advantage of a preferred embodiment of the present application is that the pilot channel is continuous wave (CW) and is therefore easier to detect than a modulated signalling channel. Moreover, since the pilot channel is continuous wave, the required pilot channel power may be reduced and the corresponding required acquisition time may be reduced also. A still further advantage is that signal to noise ratio (SNR) estimates of pilot channels are less affected by multipath fading than SNR estimates of the signalling channels. A yet further advantage is that SNR estimates of pilot channels are more accurate and less noisy than SNR estimates of signalling channels. Another advantage is that beam search time may be dramatically reduced since there are only a maximum of two pilot channels per beam as compared to a possible maximum of 16 signalling channels per beam.

Figure 4:
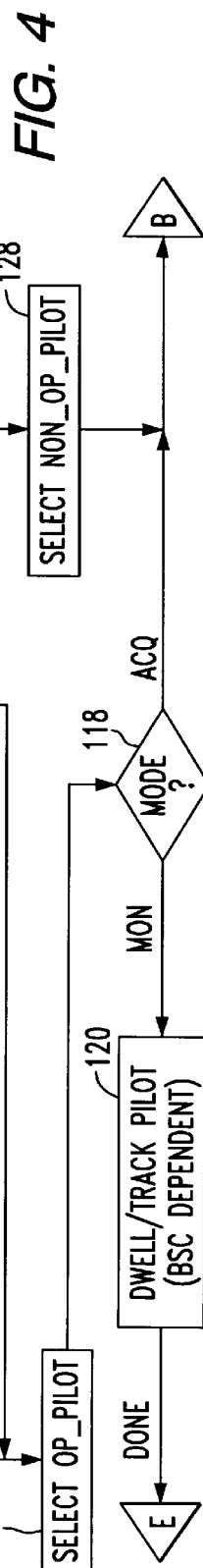
FIG. 4 is a flowchart illustrating the process steps of the beam acquisition state.

With respect to FIG. 4, it is to be understood that the processing illustrated in the flow chart is performed by a mobile terminal such as illustrated in FIG. 2. Particularly, the various processing steps illustrated in FIG. 4 may be performed by control processor 40 located on processor board 20. The processing is performed on received signal waveform samples provided to digital signal processor 37 via A/D converter 28 of RF section 18. It is to be understood that the processing described with respect to FIG. 4 is not necessarily limited to being performed by control processor 40 as illustrated in FIG. 2. For example, the process steps of FIG. 4 may be performed by discrete hardware components.

Processing in the FIG. 4 beam acquisition state 100 begins after transition from start-up state 1 via state transition A, as illustrated generally in FIG. 3. In step 102, various acquisition parameters for a beam acquisition state are set by control processor 40. The acquisition parameters which are set may generally be derived from bulletin board information on the beams and pilots available. For example, as will be subsequently described, the REPEAT variable may be set to designate the number of times a beam search is repeated. The bulletin board information used to set the acquisition parameters may be obtained from memory 50 illustrated in FIG. 2. Memory 50 may be a non-volatile memory which stores the contents of a bulletin board from a signalling channel of a most recent operational beam.

Processing subsequently proceeds to SEARCH/TEST/UPDATE OP PILOT SNR step 104 wherein acquisition of the pilot channel of the beam corresponding to the operational signalling channel is attempted. Information identifying the pilot channel of the operational signalling channel is stored within memory 50. The pilot channel of the operational signalling channel is referred to as the operational pilot, or OP PILOT. In step 104, control processor 40 coordinates the antenna search for the operational pilot (if the corresponding antenna of the mobile terminal is a beam steered antenna), measures the instantaneous SNR of the operational pilot and subsequently updates an SNR filter for the particular operational pilot. The details of the SNR measurements and filtering will be described later.

If it is determined in step 104 upon measurement of the instantaneous SNR of the operational pilot that the operational pilot is good, processing proceeds to SELECT OP PILOT step 116, wherein the operational pilot is selected as the appropriate beam for the beam coverage area in which the mobile terminal is located. Processing subsequently proceeds to MODE step 118, wherein it is determined if beam acquisition state 100 is in a monitor (MON) mode entered from signalling channel monitor state 300 via state transition D or in an acquisition (ACQ) mode entered either from start-up state 1 via state transition A or signalling channel search state 200 via transition F.

If it is determined in step 118 that the mobile terminal is in a monitor mode, processing proceeds to step 120 wherein the mobile terminal dwells and tracks on the operational pilot selected in step 116 in a beam steering controlled dependent manner. As will be described subsequently, it is to be understood that in the monitor mode of beam acquisition state 100, the mobile terminal monitors the various pilot channels in order to determine whether a stronger pilot channel can be found, which would be indicative that the mobile terminal may have entered a different beam coverage area. Since the processing as particularly described above has proceeded from step 104 through step 116 to step 118 such that the operational pilot is determined as acceptable, beam crossover is not needed. The operational pilot is tracked for a predetermined time in step 120 to ensure that the operational pilot channel is not subject to a fade or blockage condition. Processing proceeds from step 120 to signalling channel monitor state 300 via state transition E once it has been determined in step 120 that the operational pilot is not subjected to a fade or blockage condition.

On the other hand, if it is determined in step 118 that the mobile terminal is in an acquisition mode of beam acquisition state 100, processing proceeds to signalling channel search state 200 via state transition B since in the particular processing described above, the operational pilot has been determined valid in step 104.

If it is determined in step 104 that the operational pilot has not been found or has not been evaluated as good, processing proceeds to step 106 where it is determined if the REPEAT variable is greater than zero. As will be understood from the subsequent description, the REPEAT variable may be set to designate the number of times the non-operational pilot (NON OP PILOT) list of the stored bulletin board information or subset of the bulletin board information as predetermined by algorithm parameter selection is to be evaluated. It is to be understood that the non-operational pilot list includes pilots of beams other than the operational beam that the mobile terminal was last logged on.

If it is determined in step 106 that the repeat variable is greater than zero and that the non-operational pilot list is to be evaluated again, processing proceeds from step 106 to step 108 wherein REPEAT value is decremented. Processing subsequently proceeds to GET NEXT NON OP PILOT FROM BEAM/PILOT LIST step 110. If, for example, each non-operational pilot of the list has already been evaluated during the current evaluation of the list, processing loops from step 110 back to step 104 wherein the operational pilot is evaluated again prior to proceeding again through step 106. Evaluation of the operational pilot in this manner before again evaluating the non-operational pilots of the non-operational pilot list ensures that the mobile terminal was not subject to a fade or blockage which prevented acquisition of the operational pilot upon the first evaluation in step 104.

If it is determined in step 110 that all the non-operational pilots of the non-operational pilot list have not yet been evaluated during the current evaluation of the list, the frequency of the next non-operational pilot on the list is retrieved. In SEARCH/TEST/UPDATE NON OP PILOT SNR step 112, the next non-operational pilot is searched for and acquired and the SNR of this next non-operational pilot is evaluated by control processor 40. In the event that it is determined in step 112 that the SNR of this next non-operational pilot is marginal or poor (M/P), processing loops back to step 110 wherein a next non-operational pilot from the list is designated. If it is determined in step 112 that the SNR of this next non-operational pilot is good, processing proceeds to step 114. It is noted that the evaluated SNR values of the pilots are stored in memory 50.

In SEARCH/TEST/UPDATE OP PILOT SNR step 114, the operational pilot is again evaluated to ensure that the mobile terminal was not subject to a fade or blockage when the operational pilot was evaluated the first time in step 104. If it is determined that the SNR of the operational pilot is good in step 114, processing proceeds to step 116 and the operational pilot is selected. If it is determined in step 114 that the SNR of the operational pilot is marginal or poor, processing proceeds to step 128 and the non-operational pilot evaluated as good in step 112 is selected as the strongest pilot for the particular beam coverage area in which the mobile terminal is located. Thereafter, signalling channel search state 200 is entered via state transition B.

If it is determined in step 106 that the REPEAT value is not greater than zero, which is indicative that the non-operational pilot list has been evaluated REPEAT number of times and that the operational pilot and the non-operational pilots have not been evaluated as good, processing proceeds from step 106 to step 122. In step 122, a pilot from among the operational pilot and the non-operational pilots having maximum SNR is selected. As described previously, the evaluated SNR values of the operational pilot and the non-operational pilots are updated within memory 50 by control processor 40. Upon selection of the pilot having the maximum SNR, processing proceeds to step 124 wherein it is determined if the maximum SNR (MAX SNR) is greater than marginal threshold MARG. Upon determination in step 124 that the SNR of the pilot selected in step 122 is not greater than or equal to MARG, processing loops back to step 102 wherein beam acquisition state 100 is reentered and the beam acquisition process begins again.

If it is determined in step 124 that the SNR of the selected pilot is greater than or equal to MARG, processing proceeds to step 126. In step 126, it is determined if the SNR of the selected pilot (MAX SNR) is greater than the SNR of the operational pilot (OP SNR) by at least a predetermined dB improvement factor (IMP), wherein IMP may equal 2 dB for example. If the SNR of the selected pilot is determined to be greater than the SNR of the operational pilot by the improvement factor in step 126, processing proceeds to step 128 and the pilot of step 122 having maximum SNR is selected as the non-operational pilot for the beam coverage area in which the mobile terminal is presently located. If it is determined in step 126 that the SNR of the pilot selected in step 122 is not greater than the SNR of the operational pilot by at least the improvement factor, processing proceeds to step 116 and the operational pilot is selected as the pilot of the beam coverage area in which the mobile terminal is located.

The IMP factor of step 126 introduces a hysteresis factor to the acquisition process to prevent dithering between two almost equal beams along a peripheral boundary of a beam coverage area. For instance, if beam acquisition state 100 had been entered via state transition D from signalling channel monitor state 300, the operational pilot channel will be evaluated with respect to the list of non-operational pilots. Beam crossover to a different beam based on pilot evaluation will be prevented unless the non-operational pilot selected as having maximum SNR in step 122 is greater than the SNR of the operational pilot by the improvement factor. The mobile terminal will thus be prevented from switching to a beam having a non-operational pilot that is only slightly stronger than the operational pilot. This feature will ensure stable operation of the mobile terminal near peripheral boundaries of a beam coverage area.

As described previously, entry into beam acquisition state 100 via state transition D is from signalling channel monitor state 300. In this case, monitoring parameters suitable for the previously described monitor mode of beam acquisition state 100 are set within the mobile terminal. In the event that the operational pilot is found to be marginal upon entry to beam acquisition state 100 via state transition D, only a small subset (possibly 1) of primary pilots from the current bulletin board information is searched in sequence each time the state is entered. This restriction of non-operational pilots reduces the amount of time lost in beam crossover and increases availability of the mobile terminal since it is not immediately urgent to find a better channel. In the event that the operational pilot is found to be poor and the subset of non-operational pilot channels is also found to be poor, processing loops back to step 102 via step 124 and beam acquisition state 100 is invoked from the beginning of the process.

Entry into beam acquisition state 100 from state transition F, as described previously, is from signalling channel search state 200 when it is determined that no signalling channels have been found on the beam corresponding to the selected strongest pilot. This may occur if all the signalling channels of the acquired beam have been reassigned or if the data in the stored bulletin board is very old and the channels indicated thereon no longer exist. In this instance, it is necessary to prevent the corresponding beam from being immediately reselected since it is unlikely that a viable signalling channel will be found on that particular beam during immediate reevaluation in signalling channel search state 200. In order to prevent an infinite loop situation and to increase the efficiency of control processor 40, SET BEAM FAILED FLAG ON LIST step 132 is entered subsequent to entry of beam acquisition state 100 via state transition F. A beam failed flag is set and stored within non-volatile memory 50 for the corresponding beam in step 132. A SKIP COUNT is also set such that evaluation of the pilot corresponding to the failed beam will be skipped in accordance with the SKIP COUNT. For example, each time a pilot of the corresponding failed beam is designated in step 110, it is determined if the corresponding SKIP COUNT is greater than zero. In the event that the SKIP COUNT is greater than zero, the SKIP COUNT of the corresponding failed beam is decremented and the designated pilot is not evaluated. Evaluation of a next non-operational pilot on the list will subsequently occur. Accordingly, the pilot of the corresponding failed beam will be evaluated once SKIP COUNT is decremented to zero. The other non-operational pilots of the list will be evaluated a predetermined number of times in accordance with the SKIP COUNT of the corresponding failed beam before the pilot of the corresponding failed beam is evaluated again. This particular feature prevents lock-up on a failed beam. It is to be understood that the SKIP COUNT may be a parameter set during step 130 and that in a preferred embodiment, the above described processing including comparison and decrementing of the SKIP COUNT can occur as part of step 110 illustrated in FIG. 4.

The following additional details are provided with respect to step 110 of beam acquisition state 100 illustrated in FIG. 4. Designation of a non-operational pilot in step 110 and subsequent evaluation in step 112 comprises sequencing through the bulletin board list as necessary and processing of flags to enable the desired search order. In general, in beam acquisition state 100, control processor 40 of the mobile terminal shall sequentially and cyclically search the pilot channels of the beams in the following manner. In the acquisition mode of beam acquisition state 100, the operational pilot is evaluated both first and last on all acquisition passes through the list. All primary pilots of beams with assigned signalling channels are evaluated on each acquisition pass through the list. Also, secondary pilots of beams having assigned signalling channels could be evaluated on odd acquisition passes through the list to save time in cycling through the beams. The REPEAT variable should be set to at least two in all instances to ensure that secondary pilots of a search list are evaluated. Moreover, when the SKIP COUNT of a particular beam is greater than zero, pilots corresponding to the particular beam are not searched on the corresponding acquisition pass and the SKIP COUNT is decremented.

In the monitor mode of beam acquisition state 100 entered via state transition D, only primary pilots from beams with assigned signalling channels are evaluated. As in the case of the acquisition mode, pilots corresponding to beams having a SKIP COUNT greater than zero are not evaluated on the corresponding acquisition pass and the SKIP COUNT is decremented.

Figure 5:
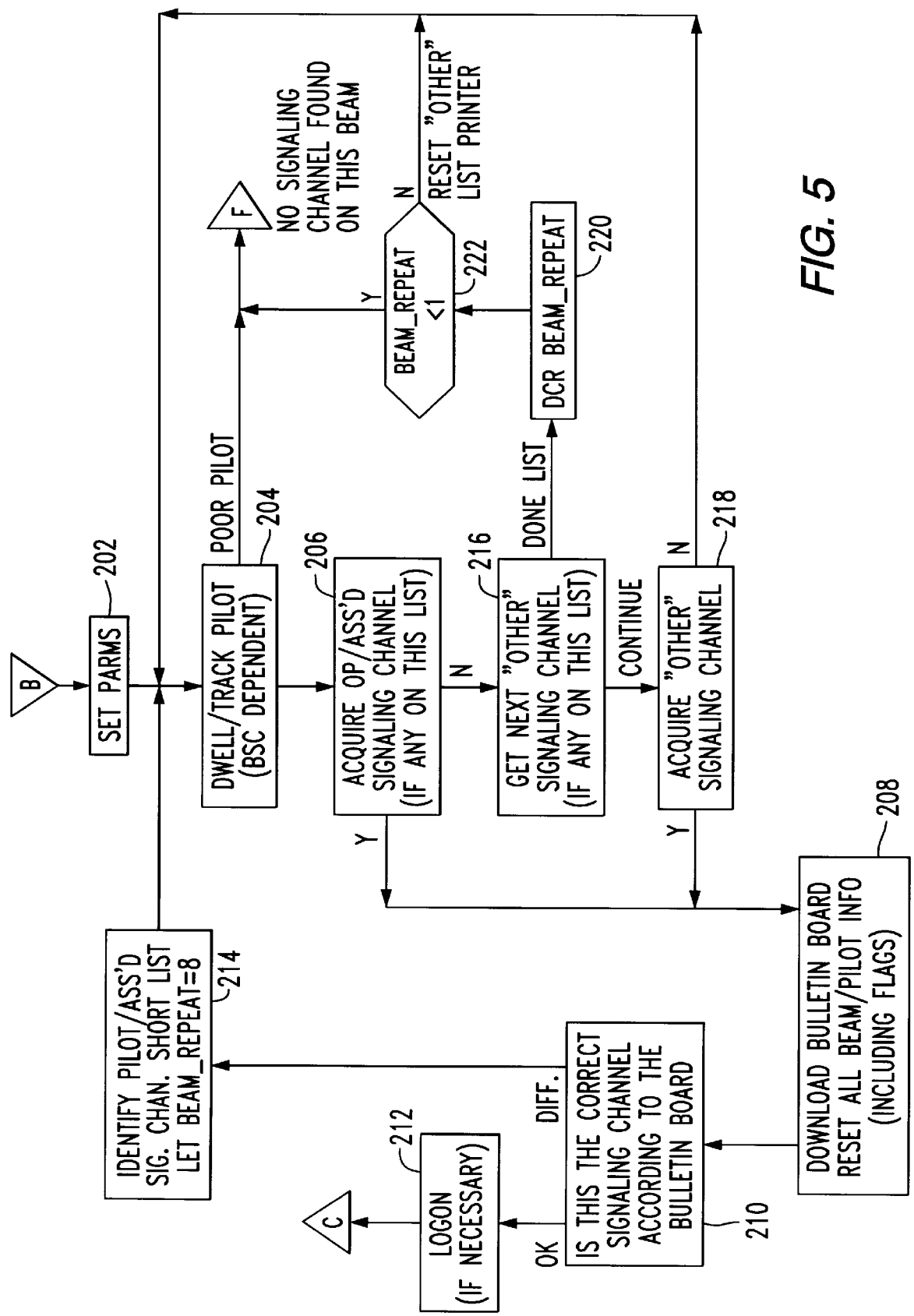
FIG. 5 is a flowchart illustrating the process steps of the signalling channel search state.

The details of signalling channel search state 200 will now be described with reference to FIG. 5, which is a flowchart illustrating the processing steps performed by control processor 40 of mobile terminal 8. In signalling channel search state 200, control processor 40 of the mobile terminal shall search signalling channels of the beam associated with the pilot acquired in beam acquisition state 100. The process involves firstly attempting to acquire the designated assigned signalling channel of the acquired beam. As previously described, each beam is assigned a primary signalling channel. In general, signalling channel acquisition is considered successful if control processor 40 can establish frame synchronization with the unique words of the signalling channel data.

Signalling channel search state 200 is entered at step 202 from beam acquisition state 100 via state transition B. In step 202, parameters such as BEAM REPEAT are set for the signalling channel search state, as will be subsequently described. Upon setting of the corresponding signalling channel search parameters, processing proceeds to step 204.

DWELL/TRACK PILOT step 204 comprises dwelling and tracking on the acquired pilot, in a beam steering control dependent manner if the antenna is a beam steered antenna. The purpose of step 204 is to determine the status of the acquired pilot based upon an SNR evaluation. In the event that it is determined in step 204 that the acquired pilot is in a poor condition for a predetermined period of time, control processor 40 establishes that no signalling channel can be found on the particular beam and processing transitions back to beam acquisition state 100 via state transition F. In the event it is determined in step 204 that the pilot SNR is not poor, processing proceeds to step 206.

In step 206, the operational or assigned signalling channel of the acquired beam is determined from a list of assigned signalling channels stored in memory 50 and is acquired. If it is determined in step 206 that control processor 40 has successfully established frame synchronization with the unique words of the data of the acquired signalling channel, processing proceeds to step 208.

In step 208, the bulletin board information of the acquired signalling channel is downloaded into memory 50 of the mobile terminal and control processor 40 resets all beam/ pilot information including relevant flags. Processing proceeds from step 208 to step 210 and control processor 40 determines if the frequency of the acquired signalling channel is the same as the frequency of the correct assigned signalling channel for the acquired beam contained in the downloaded bulletin board information. In the event that the acquired signalling channel is the correct assigned signalling channel of the acquired beam, processing proceeds from step 210 to step 212 and the mobile terminal logs on to the acquired beam in accordance with the downloaded bulletin board information.

In the event that it is determined in step 210 that the acquired signalling channel of step 206 is not the correct assigned signalling channel of the acquired beam, processing proceeds to step 214 wherein a short list of assigned signalling channels of the acquired beam is referenced. The BEAM REPEAT value is set to the value indicated in step 202, which is 8 in this exemplary embodiment. Processing then returns to step 204 and the signalling channel search procedure is continued using only the assigned signalling channels of the short list. The BEAM REPEAT value is set so that the signalling channel search process performed in connection with the short list of assigned signalling channels may be repeated an appropriate number of times before determination is made that a signalling channel cannot be found. The short list of signalling channels is prepared in accordance with the downloaded bulletin board and is therefore shorter since the possible assigned signalling channels can be accurately identified. The BEAM REPEAT value can be set in step 202.

Returning to step 206, if acquisition of the assigned signalling channel is unsuccessful, processing proceeds from step 206 to step 216. In step 216, a next other signalling channel is selected from the bulletin board list of signalling channels for the acquired beam stored in memory 50. In step 218, the next other signalling channel is acquired. If control processor 40 successfully establishes frame synchronization, the next other signalling channel is determined as successfully acquired in step 218 and processing proceeds to step 208. In the event that it is determined in step 218 that control processor 40 has not successfully established frame synchronization, processing loops back to step 204 and the mobile terminal dwells and tracks on the acquired pilot. This feature of signalling channel search state 200 enables evaluation of the assigned signalling channel in step 206 before reevaluation of the list of other signalling channels to ensure that the mobile terminal was not subject to a fade or blockage during the first acquisition attempt of the assigned signalling channel in step 206.

If it is determined in step 216 that all the other signalling channels on the list have been evaluated and that a signalling channel has not been successfully acquired, processing proceeds from step 216 to step 220. In step 220, the BEAM REPEAT value set in step 202 is decremented and processing proceeds to step 222. In step 222, if it is determined that the BEAM REPEAT value is less than 1, processing enters beam acquisition state 100 via state transition F since a signalling channel has not been found despite evaluation of the list BEAM REPEAT number of times. In the event that it is determined in step 222 that the BEAM REPEAT value is not less than 1, processing returns to step 204 and evaluation of signalling channels on the list is again performed.

It is to be understood that the signalling channel search state 200 can be entered from beam acquisition state 100 after initial acquisition of a strongest pilot. Entry into signalling channel search state 200 from beam acquisition state 100 can also occur subsequent to selection of a new non-operational pilot in steps 122, 124, 126 and 128 of FIG. 4. In this instance, a new non-operational pilot having an SNR greater than the current operational pilot by at least the improvement factor (IMP) has been selected, necessitating beam crossover and transition to signalling channel search state 200. Accordingly, upon entry of signalling channel search state 200 from beam acquisition state 100 in an acquisition mode, processing proceeds such that the mobile terminal checks the assigned signalling channel of the acquired beam before and after checking each of the other signalling channels in the acquired beam, if other signalling channels exist. Upon entry of signalling channel search state 200 from beam acquisition state 100 in a monitor mode, processing proceeds such that the mobile terminal checks only the assigned signalling channel of the acquired beam. As should be understood from the previous description, if no signalling channels are acquired on the particular beam, then the beam is marked with a SKIP COUNT and control returns to beam acquisition state 100 via state transition F. Also, the first signalling channel acquired is used to extract bulletin board information.

In signalling channel monitor state 300, the acquired signalling channel is monitored. In the event that the acquired signalling channel is lost and can not be monitored for a predetermined time period, processing transitions via state transition D to beam acquisition state 100 and processing proceeds as previously described. As also described previously, processing will transition from signalling channel monitor state 300 to beam acquisition state 100 periodically every set period of time so that the acquired pilot can be periodically evaluated. The period of time can be set during step 202. In a preferred embodiment, the set period of time may be ten minutes, but is not limited thereto.

The manner in which the pilot SNR is evaluated in the various process steps in beam acquisition state 100 illustrated in FIG. 4 is described as follows. The SNR measurement employs a nonlinearly filtered sequence of discrete SNR measurements. The SNR measurements provide periodic instantaneous estimates of the received signal. The nonlinear filtering is used to smooth the noisy peak SNR measurements and to mitigate the effects of fading, shadowing and blockage.

The pilot signal strength indicator (PSSI) values are defined as SNR measurements of the pilot. The discrete SNR estimates are performed in digital signal processor 37 and are provided to control processor 40 for subsequent PSSI estimation. These values are continually computed and processed via nonlinear filtering while a particular channel is received. Each PSSI value is calculated for a pilot channel by computing eight successive discrete Fourier transforms (DFTs) over contiguous blocks of pilot samples. In a preferred embodiment, the blocks of pilot samples may span approximately 9.48 msec each (76 msec total per PSSI). The sample rate for the mobile terminal in this preferred embodiment may be 27 KHz complex which results in DFT sizes of 256 complex samples by fast Fourier transform (FFT) computation. The energy in each frequency bin is computed for the eight DFTs, and the energies of the corresponding frequency bins across the eight DFTs are summed. The result is representative of the average power energy spectral density consisting of discrete frequency bins, each 105.45 Hz wide in the above described preferred embodiment. It is to be understood that the above-noted particular values are given by way of illustration only and are not to be considered as limiting.

The above-noted energy averaged DFT, which will be defined as the power spectral density (PSD), is processed to detect and estimate the SNR of a potential narrow band pilot. This is determined by sliding the center of a search window across approximately +/−5 KHz for example, to allow for reference frequency error. The sum of the three center bins of the search window is representative of the power of a potential pilot. The sum of the third through 19th bins on both sides of the center is representative of the noise power. The maximum ratio of the pilot power to the noise power is determined over the center frequencies within the search window. If this maximum ratio exceeds unity, then the pilot is assumed detected and the ratio represents the SNR. Specifically, this ratio is equivalent to the Es/No for a modulated QPSK signal which has the same power as the pilot. This SNR is computed over a range of zero to 25.5 dB where values lower than 0 dB are reported as 0 dB and high values are limited to 25.6 dB. Additionally, the center frequency which yields this SNR can be used to calibrate the mobile terminal frequency synthesizer. Accordingly, the above described pilot signal strength indicator is advantageously used for beam switching decisions.

The PSSIs are processed through SNR nonlinear filtering to mitigate the effects of fading and shadowing. This filtering has a fast attack/slow decay (FASD) characteristic which can be implemented as the following recursive filter expression:

$$y_k = \begin{bmatrix} (1 - \alpha)y_{k-1} + \alpha x_k; \text{ for } x_k \geq y_{k-1} \\ y_{k-1} - \text{droop}; \text{ for } x_k < y_{k-1} \end{bmatrix} \quad (1)$$

In equation (1), $x_k$ is the sample SNR measurement in dB for sample k, $y_k$ is the channel SNR measurement in dB, $\alpha$ is the fast attack filter parameter which determines the averaging of the PSSI peaks, and droop determines the filter decay rate. If α is set to 1/16, for example, then peak averaging is performed over roughly a 1.2 sec time constant. The value of droop multiplied by 791 determines the decay rate in dB/min. For example, if droop equals 1/8192, then the channel SNR would decay at a rate of approximately 0.1 dB/min. This rate is sufficient to detect the physical movement out of a beam. A medium decay constant for FAMD filtering would decay at a rate of 1 dB/sec, for example.

Channel SNR thresholds must be established to characterize a channel as good, marginal or poor. These thresholds placed upon the pilot or signalling channel SNR should be indicative of the communications channel, given the G/T (gain to noise temperature ratio) of the particular mobile terminal. Specifically, the thresholds for the pilot or signalling channel SNR should be selected such that the good, marginal or poor result applies to the communications channel, not the pilot or the signalling channels.

Upon powering up, and periodically during normal operation, the mobile terminal shall measure the SNR of the operational pilot channel. Based on this measurement, the beam shall be classified into one of the following categories:

1) GOOD: Indicates that the mobile terminal resides within the edge of coverage of the current operational beam. No further channel search is necessary.
2) MARGINAL: Indicates that the mobile terminal is probably at or near the beam edge of coverage. A beam search in alternate beams shall commence; however, the current operational beams shall continue to be used if no better pilots are found in an alternate beam.
3) POOR: Indicates that the mobile terminal has probably traveled far enough beyond the beam edge of coverage such that the current operational beam is no longer usable. Beam acquisition state 100 is invoked.

Threshold SNR values that are stored in the mobile terminal to detect beam crossover shall be entered into memory 50 of the mobile terminal as illustrated in FIG. 2 for example, prior to operation of the mobile satellite communication system. These values will be unique to each different mobile terminal configuration and shall be consistent with the antenna gain type of the mobile terminal (medium gain, high gain etc.) and noise figure performance.

Figure 6:
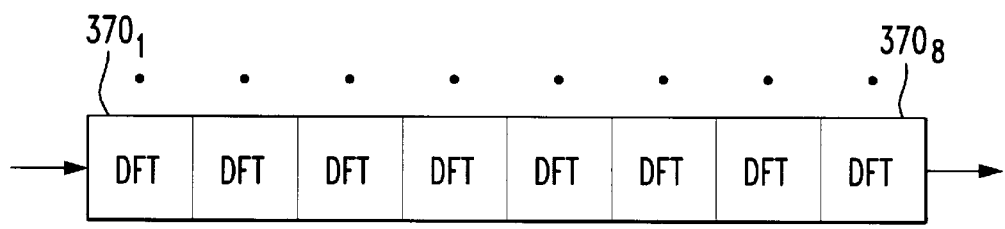
FIG. 6 illustrates a block diagram of discrete Fourier transforms used to determine signal to noise ratio of a pilot channel in a preferred embodiment.

It is to be understood that the above-described nonlinear filtering and processing described with respect to the pilot signal strength indicator is performed by control signal processor 40 of the mobile terminal illustrated in FIG. 2. Alternatively, the processing can be performed using discrete hardware components. For example, as illustrated in FIG. 6, a series of eight DFTs 370₁–370₈ can be used to provide the eight successive contiguous blocks of pilot samples described previously. DFTs 370₁–370₈ may comprise discrete Fourier transformation hardware components known in the art. Moreover, any well known fast attack/slow decay filter components may be used having the characteristic of equation (1). Also, the comparing, adding functions and the like may be implemented using any well known comparators, adders or the like. Any variations in the manner in which the PSSI and FASD SNR filtering are implemented to provide the above described function are to be considered as within the scope of the present application.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of satellite beam acquisition for a mobile terminal in a satellite communications system having a plurality of satellites which each transmit and receive signals over a plurality of satellite beams, each of the satellite beams including a pilot channel, a plurality of signalling channels carrying bulletin board information and a plurality of communication channels, the method of satellite beam acquisition including the steps of:
    (a) searching for and acquiring a strongest pilot channel of the satellite beams received by the mobile terminal;
    (b) acquiring a signalling channel of the satellite beam corresponding to the acquired pilot channel of said step (a); and
    (c) monitoring reception of the acquired signalling channel of said step (b);
    wherein said step (a) comprises:
    (a1) searching for and acquiring an operational pilot channel which is the pilot channel of an acquired signalling channel most recently monitored by the mobile terminal;
    (a2) determining a signal to noise ratio of the operational pilot channel of said step (a1); and
    (a3) establishing the operational pilot channel as the acquired pilot channel if the determined signal to noise ratio of the operational pilot channel is greater than a first predetermined signal to noise ratio (SNR) threshold.

2. The method of satellite beam acquisition of claim 1, wherein the mobile terminal downloads the bulletin board information of the acquired signalling channel, the bulletin board information including a list of non-operational pilot channels which are pilot channels other than the operational pilot channel, said step (a) further comprising:
    (a4) searching for and acquiring a next non-operational pilot channel from the list of non-operational pilot channels if the determined signal to noise ratio of the operational pilot channel is not greater than the first predetermined SNR threshold;
    (a5) determining a signal to noise ratio of the non-operational pilot channel acquired in said step (a4); and
    (a6) establishing the non-operational pilot channel as good if the determined signal to noise ratio of the non-operational pilot channel is greater than the first predetermined SNR threshold.

3. The method of satellite beam acquisition of claim 2, wherein said step (a) further comprises:
    (a7) searching for and reacquiring the operational pilot channel of step (a1);
    (a8) establishing the reacquired operational pilot channel as the acquired pilot channel if a determined signal to noise ratio of the reacquired operational pilot channel is greater than the first predetermined SNR threshold; and
    (a9) establishing the non-operational pilot channel established as good in said step (a6) as the acquired pilot channel if the determined signal to noise ratio of the reacquired operational pilot channel is not greater than the first predetermined SNR threshold.

4. The method of satellite beam acquisition of claim 3, wherein said steps (a4)–(a6) are repeated for a next non-operational pilot channel from the list of non-operational pilot channels if it is determined that the signal to noise ratio of the non-operational pilot channel is not greater than the first predetermined SNR threshold in said step (a6),
    the method further comprising returning to said step (a1) if none of the non-operational pilot channels from the list of non-operational pilot channels have been established as good upon repeating said steps (a4)–(a6) and repeating said steps (a1)–(a6) a first predetermined number of times to establish the acquired pilot channel.

5. The method of satellite beam acquisition of claim 4, further comprising:
- (a10) selecting a non-operational pilot channel from the list of non-operational pilot channels and the operational pilot channel which has the greatest determined signal to noise ratio if an acquired pilot channel has not been established after repeating said steps (a1)–(a6) the first predetermined number of times;
- (a11) returning to said step (a1) if a determined signal to noise ratio of the selected pilot channel of said step (a10) is less than a second predetermined SNR threshold, the second predetermined SNR threshold being less than the first predetermined SNR threshold;
- (a12) establishing the selected pilot channel as the acquired pilot channel if the determined signal to noise ratio of the selected pilot channel is greater than or equal to the second predetermined SNR threshold and is greater than the determined signal to noise ratio of the operational pilot channel by a hysteresis margin; and
- (a13) establishing the operational pilot channel as the acquired pilot channel if the determined signal to noise ratio of the selected pilot channel is greater than or equal to the second predetermined SNR threshold and is not greater than the determined signal to noise ratio of the operational pilot channel by the hysteresis margin.

6. A method of satellite beam acquisition for a mobile terminal in a satellite communications system having a plurality of satellites which each transmit and receive signals over a plurality of satellite beams, each of the satellite beams including a pilot channel, a plurality of signalling channels carrying bulletin board information and a plurality of communication channels, the method of satellite beam acquisition including the steps of:
- (a) searching for and acquiring a strongest pilot channel of the satellite beams received by the mobile terminal;
- (b) acquiring a signalling channel of the satellite beam corresponding to the acquired pilot channel of said step (a); and
- (c) monitoring reception of the acquired signalling channel of said step (b);

wherein said step (b) comprises:
- (b1) monitoring the acquired pilot channel and returning to said step (a) upon determination that the acquired pilot channel has not been received for a predetermined time.

7. The method of satellite beam acquisition of claim 6, wherein each satellite beam has a preferred assigned signalling channel, said step (b) further comprising:
- (b2) acquiring an assigned signalling channel of the satellite beam corresponding to the acquired pilot channel in accordance with bulletin board information of an acquired signalling channel most recently monitored by the mobile terminal; and
- (b3) establishing the assigned signalling channel as the acquired signalling channel if data of the assigned signalling channel can be accurately detected.

8. The method of satellite beam acquisition of claim 7, wherein said step (b) further comprises:
- (b4) downloading the bulletin board information of the acquired signalling channel established in said step (b3);
- (b5) confirming that the acquired signalling channel of said step (b3) is the preferred assigned signalling channel of the satellite beam corresponding to the acquired pilot channel if a determined frequency of the acquired signalling channel coincides with a designated frequency of the preferred assigned signalling channel of the satellite beam corresponding to the acquired pilot channel as listed in the downloaded bulletin board information; and
- (b6) acquiring assigned signalling channels of a short list of assigned signalling channels of the satellite beam corresponding to the acquired pilot channel as listed in the downloaded bulletin board information to establish an acquired signalling channel if the determined and designated frequencies do not coincide.

9. The method of satellite beam acquisition of claim 8, wherein the bulletin board information includes a list of assigned signalling channels for the acquired pilot channel, said step (b) further comprising:
- (b7) acquiring a next assigned signalling channel on the list of assigned signalling channels if the data of the assigned signalling channel of step (b3) can not be accurately detected;
- (b8) establishing the next assigned signalling channel as the acquired signalling channel if data of the next assigned signalling channel can be accurately detected; and
- (b9) repeating said steps (b1)–(b6) to establish an acquired signalling channel if the data of the next assigned signalling channel of said step (b8) can not be accurately detected.

10. The method of satellite beam acquisition of claim 9, comprising returning to said step (a) if an acquired signalling channel can not be established after the list of assigned signalling channels has been evaluated a predetermined beam repeat number of times.

11. The method of satellite beam acquisition of claim 6, wherein the strongest pilot channel in step (a) is a continuous wave pilot channel.

12. A method of satellite beam acquisition for a mobile terminal in a satellite communications system having a plurality of satellites which each transmit and receive signals over a plurality of satellite beams, each of the satellite beams including a pilot channel, a plurality of signalling channels carrying bulletin board information and a plurality of communication channels, the method of satellite beam acquisition including the steps of:
- (a) searching for and acquiring a strongest pilot channel of the satellite beams received by the mobile terminal;
- (b) acquiring a signalling channel of the satellite beam corresponding to the acquired pilot channel of said step (a); and
- (c) monitoring reception of the acquired signalling channel of said step (b);

wherein said step (a) comprises selecting the strongest pilot channel based on the determined instantaneous signal to noise ratio of the pilot channels, the signal to noise ratio of a pilot channel being determined by performing successive discrete Fourier transformations over contiguous blocks of the pilot channel.

13. The method of satellite beam acquisition of claim 12, wherein the effects of fading and shadowing are mitigated by non-linearly filtering the determined signal to noise ratio using a fast attack, slow decay filtering characteristic.

14. The method of satellite beam acquisition of claim 12, wherein the strongest pilot channel in step (a) is a continuous wave pilot channel.

15. A mobile terminal for use in a satellite communications system having a plurality of satellites which each transmit and receive signals over a plurality of satellite beams, each of the satellite beams including a pilot channel, a plurality of signalling channels carrying bulletin board information and a plurality of communication channels, the mobile terminal comprising:

pilot channel means for searching for and acquiring a strongest pilot channel of the satellite beams received by the mobile terminal;

signalling channel means for acquiring a signalling channel of the satellite beam corresponding to the acquired pilot channel; and monitor means for monitoring reception of the acquired signalling channel;

wherein said pilot channel means selects the strongest pilot channel based on a determined signal to noise ratio of the pilot channels, said pilot channel means comprising Fourier transformation means for performing successive discrete Fourier transformations over contiguous blocks of a pilot channel to determine the signal to noise ratio of a pilot channel.

16. The mobile terminal of claim 15, further comprising filter means having a fast attack, slow decay non-linear filter characteristic for filtering the determined signal to noise ratio to mitigate the effects of fading and shadowing.

17. A method of satellite beam acquisition for a mobile terminal in a satellite communications system having a plurality of satellites which each transmit and receive signals over a plurality of satellite beams, comprising the steps of:

(a) searching for and acquiring a strongest continuous wave pilot channel of the satellite beams received by the mobile terminal;

(b) acquiring a signalling channel of the satellite beam corresponding to the acquired continuous wave pilot channel of said step (a); and (c) monitoring reception of the acquired signalling channel of said step (b).

18. A mobile terminal for use in a satellite communications system having a plurality of satellites which each transmit and receive signals over a plurality of satellite beams, the mobile terminal comprising:

pilot channel means for searching for and acquiring a strongest continuous wave pilot channel of the satellite beams received by the mobile terminal;

signalling channel means for acquiring a signalling channel of the satellite beam corresponding to the acquired continuous wave pilot channel; and monitor means for monitoring reception of the acquired signalling channel.

* * * * *